US012700531B2

(12) United States Patent
Inaba

(10) Patent No.: US 12,700,531 B2
(45) Date of Patent: Aug. 4, 2026

(54) REACTOR, CONVERTER, AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kazuhiro Inaba, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 824 days.

(21) Appl. No.: 18/024,704

(22) PCT Filed: Aug. 2, 2021

(86) PCT No.: PCT/JP2021/028623
§ 371 (c)(1),
(2) Date: Mar. 3, 2023

(87) PCT Pub. No.: WO2022/054462
PCT Pub. Date: Mar. 17, 2022

(65) Prior Publication Data

US 2023/0377790 A1 Nov. 23, 2023

(30) Foreign Application Priority Data

Sep. 8, 2020 (JP) ................................. 2020-150704

(51) Int. Cl.
*H01F 27/24* (2006.01)
*H01F 1/20* (2006.01)
(Continued)

(52) U.S. Cl.
CPC ............... *H01F 27/24* (2013.01); *H01F 1/20* (2013.01); *H01F 27/022* (2013.01); *H01F 37/00* (2013.01)

(58) Field of Classification Search
CPC .......... H01F 27/24; H01F 1/20; H01F 27/022; H01F 37/00
(Continued)

(56) References Cited

U.S. PATENT DOCUMENTS 5,815,062 A * 9/1998 Koyuhara ............. H01F 27/346 336/212
7,212,092 B2 * 5/2007 Nuebel .................. H01F 38/12 336/83
(Continued)

FOREIGN PATENT DOCUMENTS

| | | | |
|---|---|---|---|
| JP | S60-141111 | U | 9/1985 |
| JP | H04-254307 | A | 9/1992 |
| JP | 2000-294429 | A | 10/2000 |
| JP | 2013-143454 | A | 7/2013 |

OTHER PUBLICATIONS

International Search Report issued on Nov. 2, 2021 for WO 2022/054462 A1 (4 pages).

*Primary Examiner* — Shawki S Ismail
*Assistant Examiner* — Joselito S. Baisa
(74) *Attorney, Agent, or Firm* — Venjuris, P.C.

(57) ABSTRACT

A reactor includes a coil and a magnetic core. The coil includes one winding portion. The magnetic core includes a middle core part, two side core parts and two end core parts. The middle core part has a part to be arranged inside the winding portion. Each of the two side core parts is arranged side by side with the middle core part outside the winding portion. Each of the two end core parts is arranged to connect the middle core part and the two side core parts outside end parts of the winding portions. The magnetic core has a first region and a second region having a higher
(Continued)

relative magnetic permeability than the first region. The first region includes two corner parts constituted by the middle core part and each of the two end core parts. The second region includes a base end region and a projecting region.

13 Claims, 12 Drawing Sheets

(51) Int. Cl.
*H01F 27/02* (2006.01)
*H01F 37/00* (2006.01)

(58) Field of Classification Search
USPC .................................................. 336/233, 232
See application file for complete search history.

(56) References Cited

U.S. PATENT DOCUMENTS

2005/0012586 A1* 1/2005 Sutardja .................. H01F 37/00 336/200
2010/0271157 A1* 10/2010 Talon ........................ F01L 9/20 335/229
2011/0304419 A1* 12/2011 Dal Re .................. H01F 38/12 335/297
2014/0313002 A1* 10/2014 Kuo ...................... H01F 27/385 336/178
2015/0069853 A1* 3/2015 Wang ...................... H02M 1/14 307/104
2017/0154719 A1 6/2017 Inaba

* cited by examiner

REACTOR, CONVERTER, AND POWER CONVERSION DEVICE

CROSS REFERENCE TO RELATED APPLICATIONS

This application is a national phase of PCT application No. PCT/JP2021/028623, filed on 2 Aug. 2021, which claims priority from Japanese patent application No. 2020-150704, filed on 8 Sep. 2020, all of which are incorporated herein by reference.

TECHNICAL FIELD

The present disclosure relates to a reactor, a converter and a power conversion device.

BACKGROUND

Patent Document 1 discloses a reactor provided with one coil and a magnetic core arranged inside and outside the coil. Further, Patent Document 1 discloses that, out of the magnetic core, an inner core part to be arranged inside the coil and an outer core part to be arranged outside the coil have different relative magnetic permeabilities. For example, in FIG. 3 of Patent Document 1, the relative magnetic permeability of the outer core part is higher than that of the inner core part.

PRIOR ART DOCUMENT

Patent Document

Patent Document 1: JP 2013-143454 A

SUMMARY OF THE INVENTION

A reactor of the present disclosure includes a coil and a magnetic core, the coil including one winding portion, the magnetic core including a middle core part, two side core parts and two end core parts, the middle core part having a part to be arranged inside the winding portion, each of the two side core parts being arranged side by side with the middle core part outside the winding portion, each of the two end core parts being arranged to connect the middle core part and the two side core parts outside end parts of the winding portions, the magnetic core having a first region and a second region having a higher relative magnetic permeability than the first region, the first region including two corner parts constituted by the middle core part and each of the two end core parts, the second region including a base end region and a projecting region, the base end region extending in a parallel direction of the middle core part and the two side core parts across an axis of the middle core part in each of the two end core parts, and the projecting region projecting toward the middle core part from the base end region.

A converter of the present disclosure includes the reactor of the present disclosure.

A power conversion device of the present disclosure includes the converter of the present disclosure.

DETAILED DESCRIPTION TO EXECUTE THE INVENTION

Technical Problem

Figure 1:
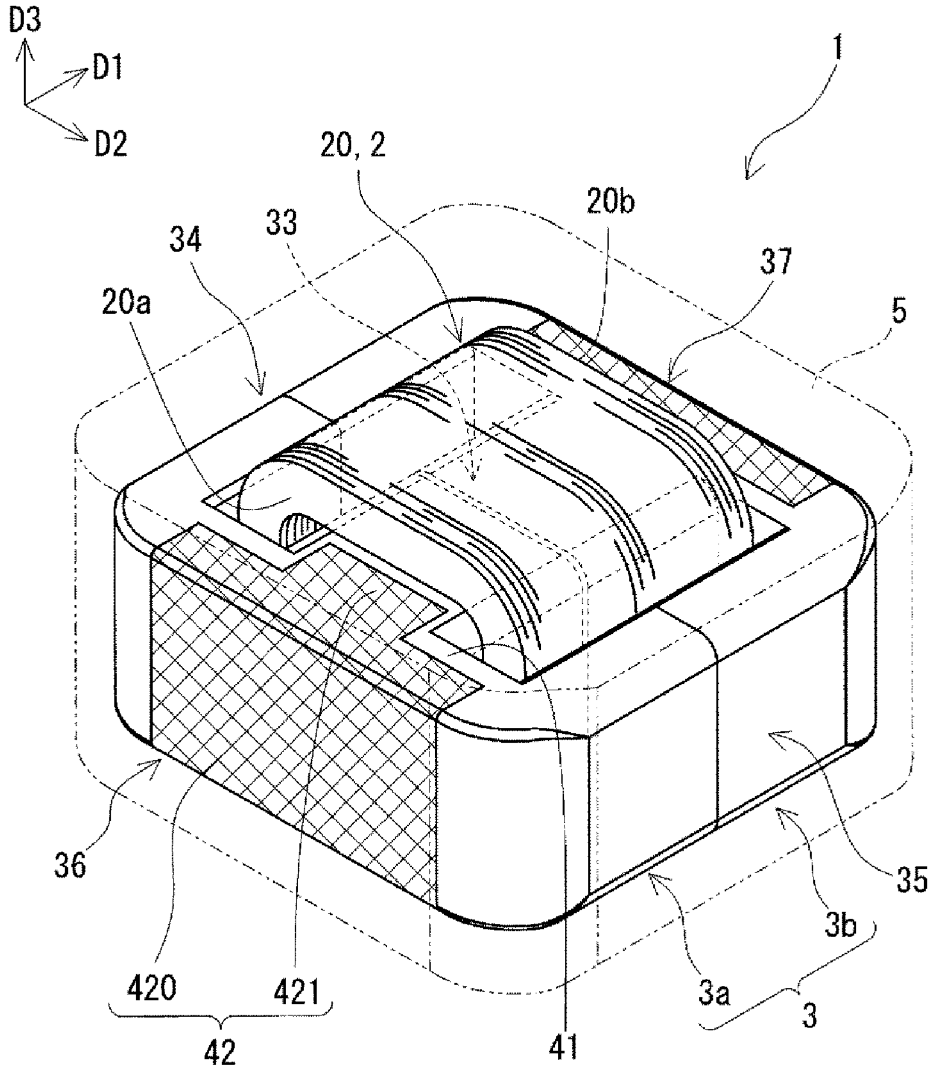
FIG. 1 is a perspective view showing an outline of a reactor of a first embodiment.

That the relative magnetic permeability of the outer core part is higher than that of the inner core part as in the technique described in Patent Document is not sufficient to reduce a leakage magnetic flux and there is a room for further improvement.

One object of the present disclosure is to provide a reactor which can reduce a leakage magnetic flux. Another object of the present disclosure is to provide a converter provided with the above reactor. Still another object of the present disclosure is to provide a power conversion device provided with the above converter.

Effect of Present Disclosure

The reactor of the present disclosure can reduce a leakage magnetic flux. The converter and the power conversion device of the present disclosure are low in loss.

DESCRIPTION OF EMBODIMENTS OF PRESENT DISCLOSURE

First, embodiments of the present disclosure are listed and described.

(1) A reactor according to an embodiment of the present disclosure includes a coil and a magnetic core, the coil including one winding portion, the magnetic core including a middle core part, two side core parts and two end core parts, the middle core part having a part to be arranged inside the winding portion, each of the two side core parts being arranged side by side with the middle core part outside the winding portion, each of the two end core parts being arranged to connect the middle core part and the two side core parts outside end parts of the winding portions, the magnetic core having a first region and a second region having a higher relative magnetic permeability than the first region, the first region including two corner parts constituted by the middle core part and each of the two end core parts, the second region including a base end region and a projecting region, the base end region extending in a parallel direction of the middle core part and the two side core parts across an axis of the middle core part in each of the two end core parts, and the projecting region projecting toward the middle core part from the base end region.

The reactor of the present disclosure can control a flow of a magnetic flux from the middle core part to the end core part by including the second region in the end core part. Specifically, the second region attracts the magnetic flux flowing from the middle core part toward the end core part to the projecting region and controls the magnetic flux to flow from the projecting region to the base end region. Further, the second region controls to introduce the magnetic flux flowing from the end core part toward the middle core part into the winding portion. By these controls, the reactor of the present disclosure can reduce a leakage magnetic flux. Particularly, the reactor of the present disclosure can reduce the leakage magnetic flux from the corner parts constituted by the middle core part and the end core parts. As the leakage magnetic flux is reduced in this way, loss can be reduced.

(2) As one aspect of the reactor, the projecting region has a tip part reaching the end part of the winding portion on a proximate side.

In the above aspect, since there is no location constituted by only the first region on sides closer to the respective end core parts than the end parts of the winding portion in the middle core part, the leakage magnetic flux is easily suppressed.

(3) As one aspect of the reactor, a central region in an axial direction of the middle core part is constituted by the first region.

In the above aspect, the relative magnetic permeability of the magnetic core is easily reduced as compared to the case where the middle core part is constituted by the second region over an entire length. Due to a low relative magnetic permeability of the magnetic core, a gap provided in the magnetic core can be reduced. By reducing the gap, a leakage magnetic flux from the gap can be reduced.

(4) As one aspect of the reactor, a region of each of the two end core parts facing the winding portion is constituted by the first region.

In the above aspect, the magnetic flux can be unevenly distributed on sides of the end core parts distant from the winding portion. By unevenly distributing the magnetic flux, the linkage of the magnetic flux leaking from the corner parts constituted by the middle core part and the end core parts to the coil can be suppressed. Further, in the above aspect, the relative magnetic permeability of the magnetic core is easily reduced as compared to the case where the regions of the end core parts on the side of the winding portion are constituted by the second region. Due to a low relative magnetic permeability of the magnetic core, a gap provided in the magnetic core can be reduced. By reducing the gap, a leakage magnetic flux from the gap can be reduced.

(5) As one aspect of the reactor, each of the two side core parts is constituted by the first region.

In the above aspect, the relative magnetic permeability of the magnetic core is easily reduced as compared to the case where the side core parts are constituted by the second region over entire lengths. Due to a low relative magnetic permeability of the magnetic core, a gap provided in the magnetic core can be reduced. By reducing the gap, a leakage magnetic flux from the gap can be reduced.

(6) As one aspect of the reactor, the relative magnetic permeability in the first region is 5 or more and 50 or less.

In this aspect, the leakage magnetic flux is easily reduced.

(7) As one aspect of the reactor, the relative magnetic permeability in the second region is 50 or more and 500 or less.

In the aspect, the magnetic flux easily flows to the second region.

(8) As one aspect of the reactor, the first region is constituted by a compact of a composite material, a soft magnetic powder being dispersed in a resin in the composite material.

In the composite material, a content of the soft magnetic powder is easily adjusted to reduce the relative magnetic permeability. Thus, in the above aspect, the first region having a low relative magnetic permeability is easily obtained.

(9) As one aspect of the reactor, the second region is constituted by a powder compact made of a soft magnetic powder.

In the powder compact, a content of the soft magnetic powder is easily increased and the relative magnetic permeability is easily increased as compared to the composite material in which the soft magnetic powder is dispersed in the resin. Thus, in the above aspect, the second region having a high relative magnetic permeability is easily obtained.

(10) As one aspect of the reactor, the magnetic core is composed of two core pieces having the same shape, and each of the two core pieces is an E-shaped member including one of the two end core parts, a part of the middle core part and a part of each of the two side core parts.

In the above aspect, the two core pieces can be fabricated by molds having the same shape and the productivity of the reactor can be improved.

(11) As one aspect of the reactor, a molded resin portion is provided which at least partially covers the magnetic core.

In the above aspect, the magnetic core can be protected from an external environment. If the molded resin portion is interposed between the coil and the magnetic core, insulation between the coil and the magnetic core is easily ensured. If the molded resin portion is present over and between a plurality of core pieces, the core pieces are easily positioned with respect to each other. If the molded resin portion is present over and between the coil and the magnetic core, the coil and the magnetic core are easily positioned with respect to each other.

(12) A converter according to an embodiment of the present disclosure includes the reactor of any one of (1) to (11) described above.

Since including the reactor of the present disclosure, the converter of the present disclosure is low in loss.

(13) A power conversion device according to an embodiment of the present disclosure includes the converter of (12) described above.

Since including the converter of the present disclosure, the power conversion device of the present disclosure is low in loss.

Details of Embodiments of Present Disclosure

Specific examples of reactors according to embodiments of the present disclosure are described below with reference to the drawings. The same reference signs denote the same components in figures. Some of components may be shown in an exaggerated or simplified manner for the convenience of description in each figure. A dimension ratio of each part in each figure may be different from the actual one. Note that the present invention is not limited to these illustrations and is represented by claims and intended to include all changes in the scope of claims and in the meaning and scope of equivalents.

First Embodiment

A reactor 1 of a first embodiment is described with reference to FIGS. 1 to 4. The reactor 1 includes a coil 2 and a magnetic core 3. One of features of the reactor 1 of the first embodiment is that the coil 2 includes one winding portion 20 and that the magnetic core 3 has first regions 41 and second regions 42 having different magnetic properties. Each component is described in detail below.

<<Coil>>

Figure 2:
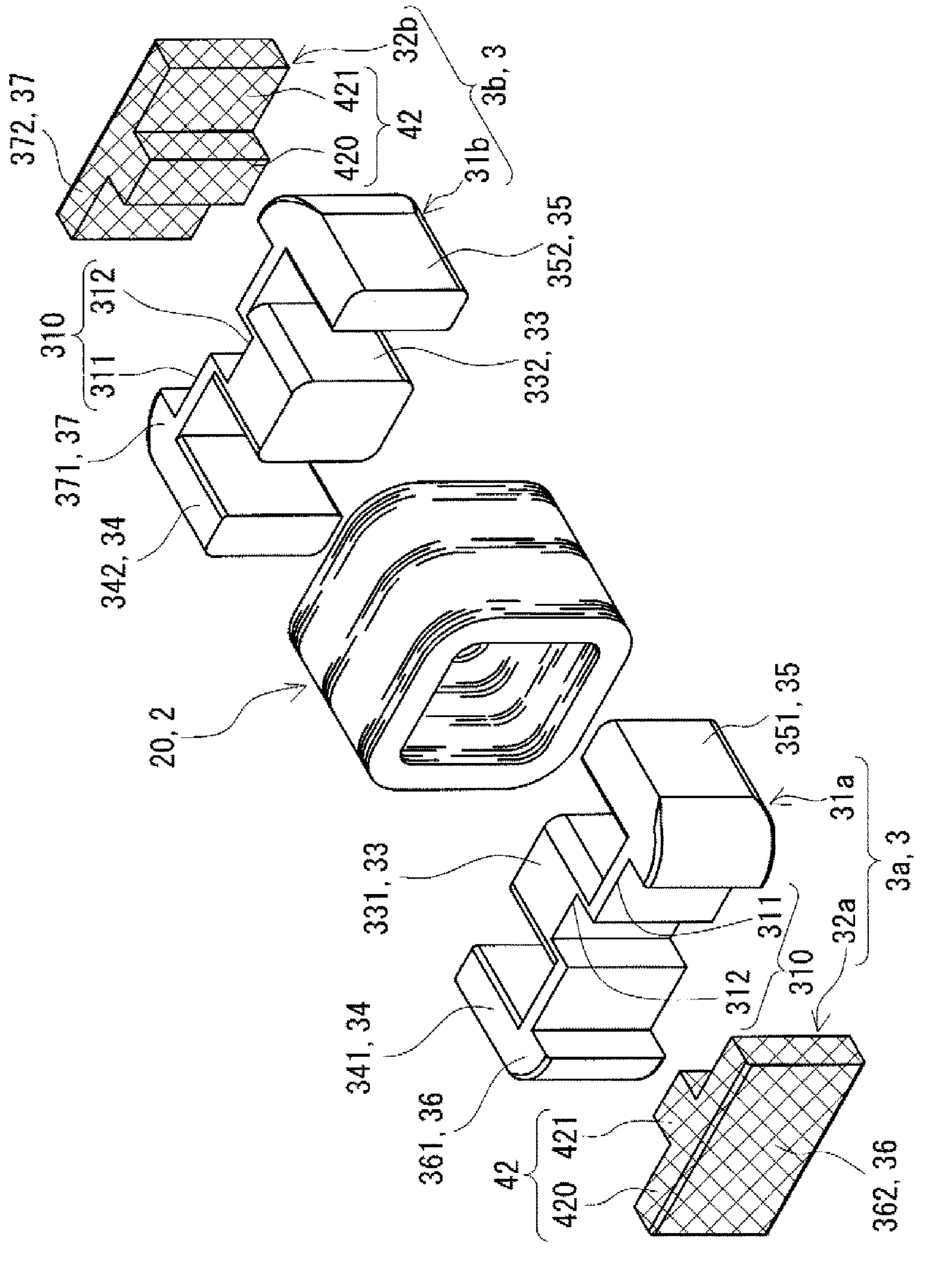
FIG. 2 is an exploded perspective view showing an outline of the reactor of the first embodiment in a disassembled state.
Figure 3:
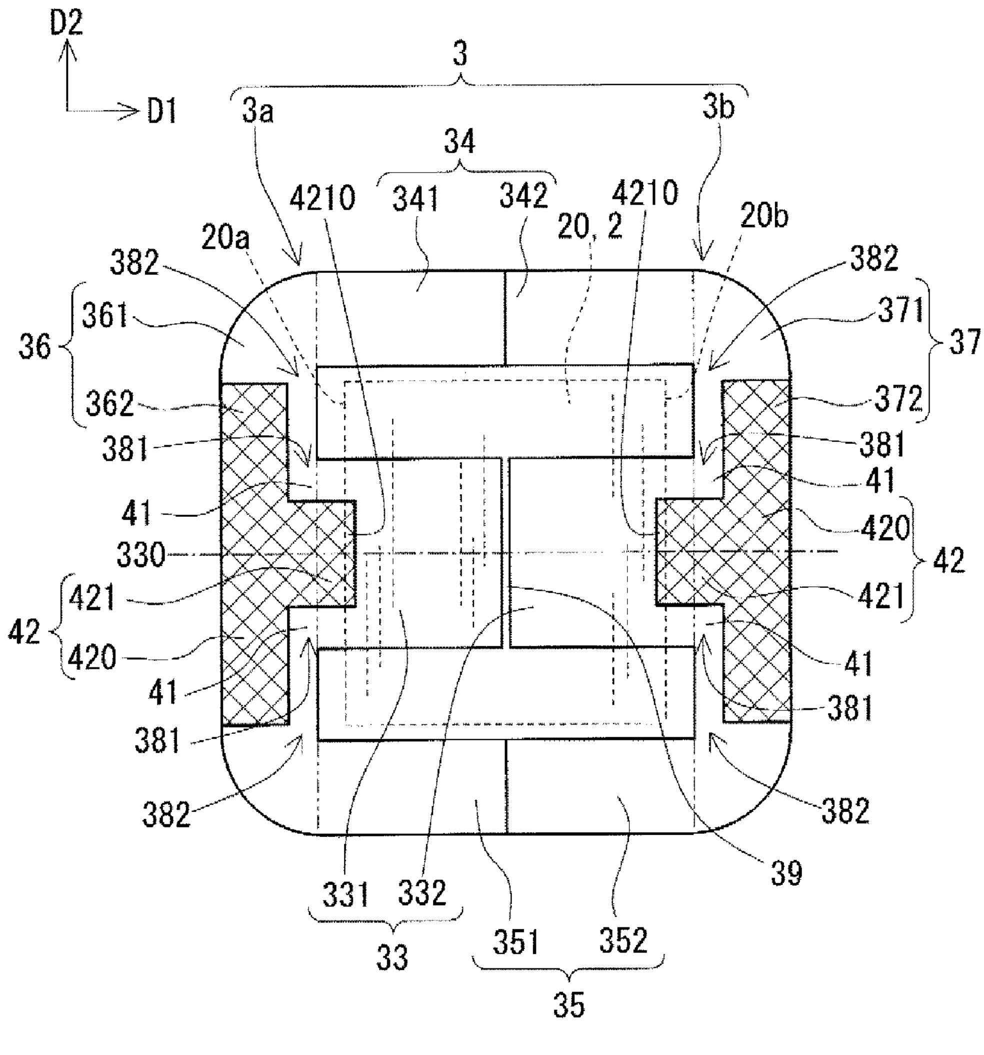
FIG. 3 is a plan view showing the outline of the reactor of the first embodiment.

As shown in FIGS. 1 to 3, the coil 2 includes one winding portion 20. In FIG. 3, the coil 2 is shown by a broken line for the convenience of description. The winding portion 20 is formed by spirally winding one winding wire. Both end parts of the winding wire are pulled out from end parts 20*a*, 20*b* in an axial direction of the winding portion 20. Unillustrated terminal fittings are mounted on the both end parts of the winding wire pulled out from the winding portion 20. An unillustrated external device such as a power supply is connected to the terminal fittings. Note that only the winding portion 20 is shown and the end parts and the like of the winding wire are not shown in FIG. 1 and the like.

An example of the winding wire is a coated wire including a conductor wire and an insulation coating. The conductor wire is made of copper or the like. The insulation coating is made of resin such as polyamide imide. Examples of the coated wire include a coated rectangular wire having a rectangular cross-sectional shape and a coated round wire having a circular cross-sectional shape.

The coil 2 of this example is an edgewise coil formed by winding the coated rectangular wire in an edgewise manner into a rectangular tube shape. Thus, the winding portion 20 has a quadrilateral end surface shape when viewed from the axial direction. Quadrilateral shapes include square shapes besides rectangular shapes. The winding portion 20 has four flat surfaces and four corner parts. Each corner part is rounded. Surfaces of the winding portions 20 other than the corner parts are constituted by substantially flat surfaces. Thus, a large contact area of the winding portion 20 and an installation target is easily secured. By having the large contact area, the winding portion 20 is easily stably held on the installation target. Further, by having the large contact area, the reactor 1 easily dissipates heat to the installation target via the winding portion 20. The winding portion 20 may be a hollow cylindrical coil.

<<Magnetic Core>>

Figure 4:
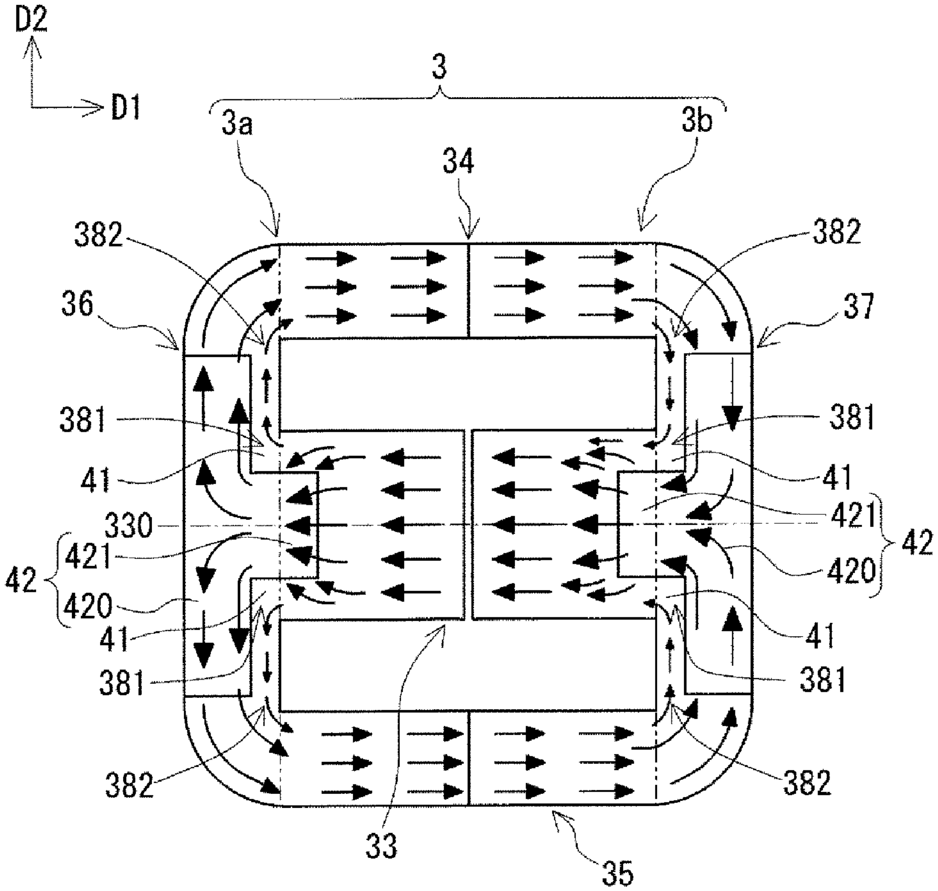
FIG. 4 is a diagram schematically showing a flow of a magnetic flux in the reactor of the first embodiment.

As shown in FIGS. 1 to 4, the magnetic core 3 includes one middle core part 33, two side core parts 34, 35 and two end core parts 36, 37. The magnetic core 3 is formed into a θ shape as a whole by combining these core parts (FIGS. 3 and 4). The magnetic core 3 of this example is configured by combining two core pieces 3*a*, 3*b*. In this example, each core piece 3*a*, 3*b* is an E-shaped member.

Further, as shown in FIGS. 1 to 4, the magnetic core 3 has first regions 41 and second regions 42. The first and second regions 41, 42 have different relative magnetic permeabilities. A flow of a magnetic flux in the magnetic core 3 is controlled by arranging the regions having different relative magnetic permeabilities at predetermined locations. In each figure, the second regions 42 are cross-hatched for easy understanding.

The shape of the magnetic core 3 is first described and, then, a control of the magnetic flux flow is described below. In the following description, a direction along the axial direction of the winding portion 20 is referred to as a first direction D1, a parallel direction of the one middle core part 33 and the two side core parts 34, 35 is referred to as a second direction D2 and a direction orthogonal to both the first and second directions D1, D2 is referred to as a third direction D3. Further, in the following description, a side of each side core part 34, 35 distant from the winding portion 20 is called an outer side, and a side of each side core part 34, 35 near the winding portion 20 is called an inner side. Similarly, a side of each end core part 36, 37 distant from the winding portion 20 is called an outer side, and a side of each end core part 36, 37 near the winding portion 20 is called an inner side.

[Shape]

The middle core part 33 includes a part to be arranged inside the winding portion 20. The two side core parts 34, 35 are arranged side by side with the middle core part 33 outside the winding portion 20. The two end core parts 36, 37 are arranged to connect the middle core part 33 and the two side core parts 34, 35 outside the end parts 20*a*, 20*b* of the winding portion 20. In the magnetic core 3, a magnetic flux flows to form a closed magnetic path when the coil 2 is excited by connecting the middle core part 33, the two side core parts 34, 35 and the two end core parts 36, 37. In FIGS. 3 and 4, a boundary between the middle core part 33 and each end core part 36, 37 and a boundary between each side core part 34, 35 and each end core part 36, 37 are indicated by two-dot chain lines.

(Middle Core Part)

The middle core part 33 has a shape substantially corresponding to the inner peripheral shape of the winding portion 20. In this example, the middle core part 33 has a rectangular column shape, more specifically a quadrilateral column shape, and has a quadrilateral end surface shape when viewed from the axial direction. Corner parts of the middle core part 33 are rounded to extend along the corner parts of the winding portion 20. A clearance is present between the outer peripheral surface of the middle core part 33 and the inner peripheral surface of the winding portion 20. If the reactor 1 includes a molded resin portion 5 to be described later, a resin constituting the molded resin portion 5 is filled into this clearance.

As shown in FIG. 3, the middle core part 33 of this example is composed of a first middle core part 331, a second middle core part 332 and a gap 39. By providing the gap 39, an inductance of the reactor 1 is easily adjusted. An unillustrated gap material is, for example, arranged in the gap 39. A known one can be used as the gap material. The gap material can be preferably made of nonmagnetic ceramic or resin. The gap 39 may be an air gap without interposing the gap material. Further, if the reactor 1 includes the molded resin portion 5 to be described later, the resin constituting the molded resin portion 5 may be filled into the gap 39. In this case, the resin constituting the molded resin portion 5 is the gap material.

A length of the middle core part 33 along the first direction D1 is equal to or longer than that of the winding portion 20 along the first direction D1. In this example, the length of the middle core part 33 along the first direction D1 is slightly longer than that of the winding portion 20 along the first direction D1 as shown in FIG. 3. That is, the middle core part 33 includes a part to be arranged inside the winding portion 20 and parts to be arranged outside the winding portion 20. Both end parts of the middle core part 33 are located outside the winding portion 20.

(Side Core Parts)

The shape of each side core part 34, 35 is not particularly limited as long as the side core part 34, 35 is shaped to extend along the first direction D1 outside the winding portion 20. In this example, each side core part 34, 35 is in the form of a rectangular parallelepiped extending along the first direction D1. The respective side core parts 34, 35 are arranged to sandwich the winding portion 20 from outside. If the winding portion 20 is an edgewise coil having a quadrilateral tube shape, the respective side core parts 34, 35 are arranged to face two surfaces at positions facing each other, out of four surfaces constituting the outer peripheral surface of the winding portion 20. The surfaces of the winding portion 20 not facing the both side core parts 34, 35 are exposed from the magnetic core 3.

As shown in FIG. 3, the side core part 34 is composed of a first side core part 341 and a second side core part 342. In this example, no gap is present between the first and second side core parts 341, 342. Similarly to the side core part 34, the side core part 35 is also composed of a first side core part 351 and a second side core part 352. In this example, no gap is present between the first and second side core parts 351, 352.

In this example, the two side core parts 34, 35 have the same shape and dimensions. A length of each side core part 34, 35 along the first direction D1 is equal to that of the middle core part 33 along the first direction D1. In this example, a length of each side core part 34, 35 along the second direction D2 is shorter than that of the middle core part 33 along the second direction D2. In this example, the sum of the length of the side core part 34 along the second direction D2 and that of the side core part 35 along the second direction D2 is equal to the length of the middle core part 33 along the second direction D2. In this example, a length of each side core part 34, 35 along the third direction D3 is equal to that of the middle core part 33 along the third direction D3. Thus, in this example, the sum of a cross-sectional area of the side core part 34 and that of the side core part 35 is equal to a cross-sectional area of the middle core part 33. The cross-sectional area here is a cross-sectional area of a cut surface of each core part 33, 34, 35 along the second direction D2. The sum of the lengths of the respective side core parts 34, 35 along the second direction D2 may be shorter or longer than the length of the middle core part 33 along the second direction D2. The lengths of the respective side core parts 34, 35 along the third direction D3 may be shorter or longer than the length of the middle core part 33 along the third direction D3. The lengths of the respective side core parts 34, 35 along the third direction D3 are shorter than the length of the middle core part 33 along the third direction D3. The lengths of the respective side core parts 34, 35 along the third direction D3 may be equal to or longer than the length of the middle core part 33 along the third direction D3. The two side core parts 34, 35 may have different shapes and dimensions.

(End Core Parts)

The shapes of the respective end core parts 36, 37 are not particularly limited as long as the end core parts 36, 37 are shaped to connect end parts of the one middle core part 33 and the two side core parts 34, 35. In this example, each end core part 36, 37 has a rectangular parallelepiped shape long in the second direction D2. In each end core part 36, 37 of this example, outer corner parts of both end parts are arcuately rounded.

In this example, the two end core parts 36, 37 have the same shape and dimensions. A length of each end core part 36, 37 along the first direction D1 is equal to that of each side core part 34, 35 along the second direction D2. A length of each end core part 36, 37 along the third direction D3 is equal to those of the middle core part 33 and the respective side core parts 34, 35 along the third direction D3. The two end core parts 36, 37 may have different shapes and dimensions.

(Combination)

As shown in FIGS. 1 and 3, the magnetic core 3 of this example is configured by combining the two core pieces 3*a*, 3*b* having the same shape. The respective core pieces 3*a*, 3*b* are divided pieces divided to separate the magnetic core 3 in the first direction D1. The magnetic core 3 is divided in a central part in the first direction D1. Thus, the respective core pieces 3*a*, 3*b* are E-shaped members. Since having the same shape, the respective core pieces 3*a*, 3*b* can be fabricated by molds having the same shape.

The two core pieces 3*a*, 3*b* have the same shape and dimensions. One core piece 3*a* includes the end core part 36, the first middle core part 331 and two first side core parts 341, 351. The other core piece 3*b* includes the end core part 37, the second middle core part 332 and two second side core parts 342, 352. The two core pieces 3*a*, 3*b* may have different shapes and dimensions. Modes in which the two core pieces 3*a*, 3*b* have different shapes and dimensions are described in sixth to eighth embodiments.

Each of the first and second middle core parts 331, 332 is a part of the middle core part 33. The middle core part 33 of this example includes the gap 39. Thus, each of the first and second middle core parts 331, 332 is a part obtained by halving a remaining part of the middle core part 33 except the gap 39.

Each of the first and second side core parts 341, 342 is a part of the side core part 34. The side core part 34 includes no gap. Thus, each of the first and second side core parts 341, 342 is a part obtained by halving the side core part 34. Similarly, each of the first and second side core parts 351, 352 is a part of the side core part 35. The side core part 35 includes no gap. Thus, each of the first and second side core parts 351, 352 is a part obtained by halving the side core part 35.

In this example, as shown in FIG. 2, the core piece 3*a* is configured by combining a first core piece 31*a* and a second core piece 32*a*. The first and second core pieces 31*a*, 32*a* are regions corresponding to the first and second regions 41, 42 to be described later. The core piece 3*a* is typically obtained by arranging the second core piece 32*a* in a mold and molding the first core piece 31*a* around the second core piece 32*a*. Although the first and second core pieces 31*a*, 32*a* are shown to be individually separated in FIG. 2, these are actually integrally configured. The core piece 3*a* may be configured by combining the individually molded first and second core pieces 31*a*, 32*a*.

The second core piece 32*a* includes a base end region 420 extending in the second direction D2 and a first projecting region 421 extending in the first direction D1 as in the second region 42 to be described later. The base end region 420 and a part of the first projecting region 421 constitute the second end core part 362. The second end core part 362 is a part of the end core part 36. A tip part of the first projecting region 421 is a part of the first middle core part 331.

The first core piece 31*a* includes the first end core part 361, the first middle core part 331 and two first side core parts 341, 351. The first end core part 361 is a remaining part of the end core part 36. The first core piece 31*a* is formed with a recess 310 corresponding to the shape of the second core piece 32*a*. The recess 310 includes a first recess 311 and a second recess 312. The first recess 311 is formed to correspond to the base end region 420 of the second core piece 32*a*. The second recess 312 is formed to correspond to the first projecting region 421 of the second core piece 32*a*. A part of the first core piece 31*a* is arranged in an inner region extending from the base end region 420 to the first projecting region 421 in the second core piece 32*a*. By this first core piece 31*a*, the end core part 36 and the first middle core part 331 are integrally configured. Further, by this first core piece 31*a*, first corner parts 381 (FIGS. 3 and 4) constituted by the end core part 36 and the first middle core part 331 are formed.

Similarly, as shown in FIG. 2, the core piece 3*b* is configured by combining a first core piece 31*b* and a second core piece 32*b*. The first and second core pieces 31*b*, 32*b* are regions corresponding to the first and second regions 41, 42 to be described later. The core piece 3*b* is typically obtained by arranging the second core piece 32*b* in a mold and molding the first core piece 31*b* around the second core piece 32*b*. Although the first and second core pieces 31*b*, 32*b* are shown to be individually separated in FIG. 2, these are actually integrally configured. The core piece 3*b* may be configured by combining the individually molded first and second core pieces 31*b*, 32*b*.

The second core piece 32*b* includes a base end region 420 extending in the second direction D2 and a first projecting region 421 extending in the first direction D1, similarly to the second core piece 32*a*. The base end region 420 and a part of the first projecting region 421 constitute the second end core part 372. The second end core part 372 is a part of the end core part 37. A tip part of the first projecting region 421 is a part of the second middle core part 332.

The first core piece 3*b* includes the first end core part 371, the second middle core part 332 and two second side core parts 342, 352. The first end core part 371 is a remaining part of the end core part 37. The first core piece 31*b* is formed with a recess 310 corresponding to the shape of the second core piece 32*b*. The recess 310 includes a first recess 311 and a second recess 312. The first recess 311 is formed to correspond to the base end region 420 of the second core piece 32*b*. The second recess 312 is formed to correspond to the first projecting region 421 of the second core piece 32*b*. A part of the first core piece 31*b* is arranged in an inner region extending from the base end region 420 to the first projecting region 421 in the second core piece 32*b*. By this first core piece 31*b*, the end core part 37 and the second middle core part 332 are integrally configured. Further, by this first core piece 31*b*, the first corner parts 381 (FIGS. 3 and 4) constituted by the end core part 37 and the second middle core part 332 are formed.

[Control of Magnetic Flux Flow]

The magnetic core 3 has the first regions 41 having a relatively low relative magnetic permeability and the second regions 42 having a relatively high relative magnetic permeability.

(First Regions)

The first regions 41 are regions having a relatively low relative magnetic permeability, out of the magnetic core 3. For example, the relative magnetic permeability in the first regions 41 is 5 or more and 50 or less. The relative magnetic permeability in the first regions 41 is further 10 or more and 45 or less, particularly 15 or more and 40 or less.

As shown in FIG. 3, the first regions 41 are provided at least in the first corner parts 381. The first corner parts 381 are two corner parts constituted by the middle core part 33 and one end core part 36 and two corner parts corner parts constituted by the middle core part 33 and the other end core part 37.

Further, the first region 41 may be provided in a central region of the middle core part 33 along the first direction D1. Particularly, the first region 41 may be provided in a region located inside the winding portion 20, out of the middle core part 33. Since most part of the middle core part 33 is constituted by the first regions 41, the relative magnetic permeability of the magnetic core 3 is easily reduced as compared to the case where the middle core part 33 is constituted by the second regions 42 over the entire length. Due to a low relative magnetic permeability of the magnetic core 3, the gap 39 provided in the magnetic core 3 can be made small. Since the gap 39 can be made small, a leakage magnetic flux from the gap 39 can be reduced.

Further, the first regions 41 may be provided in regions of the respective two end core parts 36, 37 facing the winding portion 20. These regions are regions extending from the first corner parts 381 to second corner parts 382 (FIG. 3). The second corner parts 382 are two corner parts on inner sides constituted by one end part 36 and the two side core parts 34, 35 and two corner parts on inner sides constituted by the other end core part 37 and the two side core parts 34, 35. By providing the first regions 41 in the regions extending from the first corner parts 381 to the second corner parts 382, a magnetic flux can be unevenly distributed on outer sides of the respective end core parts 36, 37. By unevenly distributing the magnetic flux, the linkage of the magnetic flux leaking from the first and second corner parts 381, 382 to the coil 2 can be suppressed. Further, by providing the first regions 41 in the above regions, the relative magnetic permeability of the magnetic core 3 is easily reduced as compared to the case where the regions on the inner sides of the respective end core parts 36, 37 are constituted by the second regions 42. Due to a low relative magnetic permeability of the magnetic core 3, the magnetic saturation of the magnetic core 3 can be suppressed. Further, by providing the first regions 41 in the above regions, the one middle core part 33, the two side core parts 34, 35 and the two end core parts 36, 37 are easily fabricated by integrated objects.

Further, the second regions 41 may be provided in at least partial regions of the two side core parts 34, 35. Particularly, the first regions 41 may be provided in the entire regions of the two side core parts 34, 35. By providing the first regions 41 in the respective side core parts 34, 35, the relative magnetic permeability of the magnetic core 3 is easily reduced as compared to the case where the respective side core parts 34, 35 are constituted by the second regions 42 over the entire lengths. Due to a low relative magnetic permeability of the magnetic core 3, the gap 39 provided in the magnetic core 3 can be made small. Since the gap 39 can be made small, a leakage magnetic flux from the gap 39 can be reduced.

The first regions 41 of this example are provided in all of the respective first corner parts 381, the regions extending from the respective first corner parts 381 to the respective second corner parts 382, the central region of the middle core part 33 and the entire regions of the respective side core parts 34, 35. Further, the first regions 41 of this example are also provided on both end parts of the respective end core parts 36, 37 along the second direction D2.

The first regions 41 of this example are constituted by the respective first core pieces 31*a*, 31*b* (FIG. 2). A constituent material of the first regions 41 is described in detail together with that of the second regions 42 later.

(Second Regions)

The second regions 42 are regions having a higher relative magnetic permeability than the first regions 41. For example, the relative magnetic permeability in the second regions 42 is 50 or more and 500 or less. The relative magnetic permeability in the second regions 42 is further 55 or more and 450 or less, particularly 60 or more and 400 or less.

As shown in FIGS. 3 and 4, the second regions 42 are unevenly distributed on outer sides of the respective end core parts 36, 37.

The second region 42 includes the base end region 420 and the first projecting region 421. The base end region 420 and the first projecting region 421 are connected.

As shown in FIG. 3, the base end region 420 is provided to extend along the second direction D2 across an axis 330 of the middle core part 33 in each end core part 36, 37. In each figure, the axis 330 is indicated by a dashed-dotted line. The axis 330 of the middle core part 33 is a straight line, which is an extension of a center line of the middle core part 33. In this example, the middle core part 33 has a quadrilateral column shape. Thus, the axis 330 of the middle core part 33 in this example is a straight line extending along a longitudinal direction of the middle core part 33 through an intersection of diagonals of a quadrilateral shape. The axis 330 of the middle core part 33 in this example is a straight line extending along the longitudinal direction of the middle core part 33 to bisect the length of the middle core part 33 along the second direction D2.

The base end region 420 extends further outward than the respective first corner parts 381 in the second direction D2 in each end core part 36, 37. In this example, both end parts of the base end region 420 along the second direction D2 are located in regions between the first and second corner parts 381, 382. Further, in this example, the both end parts of the base end region 420 along the second direction D2 are located in regions flush with the outer surface of the winding portion 20.

The base end region 420 of this example constitutes the outer surface of each end core part 36, 37 along the second direction D2. There are intervals between the base end region 420 of this example and the surface of each end core part 36, 37 facing the end surface of the winding portion 20. Further, there are intervals between the base end region 420 of this example and both side surfaces of each end core part 36, 37 along the second direction D2. The first regions 41 are provided in these intervals.

The first projecting region 421 projects toward the middle core part 33 from the base end region 420. The first projecting region 421 of this example is provided from each end core part 36, 37 to the middle core part 33. The first projecting region 421 located on a left side of FIG. 4 has a function of attracting the magnetic flux flowing from the middle core part 33 toward the end core part 36. By attracting the magnetic flux to the first projecting region 421 located on the left side of FIG. 4, a leakage magnetic flux from the first corner parts 381 located on the side of the end core part 36 can be reduced. The first projecting region 421 located on a right side of FIG. 4 has a function of introducing the magnetic flux flowing from the end core part 37 toward the middle core part 33 into the winding portion 20 (FIG. 3). By introducing the magnetic flux into the winding portion 20 (FIG. 3) through the first projecting region 421 located on the right side of FIG. 4, a leakage magnetic flux from the first corner parts 381 located on the side of the end core part 37 can be reduced.

The first projecting region 421 may be provided with a tip part 4210 reaching the end part of the winding portion 20 on a proximate side. For example, in FIG. 3, the tip part 4210 of the first projecting region 421 provided on the side of the end core part 36 reaches the end part 20*a* located on a left side of FIG. 3 in the winding portion 20. Similarly, in FIG. 3, the tip part 4210 of the first projecting region 421 provided on the side of the end core part 37 reaches the end part 20*b* located on a right side of FIG. 3 in the winding portion 20. By including the tip parts 4210, the leakage magnetic flux is easily suppressed since there is no location where only the first regions 41 are located in regions of the middle core part 33 outside the winding portion 20.

As shown in FIG. 3, the tip parts 4210 of this example are located more inward of the winding portion 20 than the respective end parts 20*a*, 20*b* of the winding portion 20. By locating the tip parts 4210 inside the winding portion 20, it is easily suppressed that locations where only the first regions 41 are provided are formed on outer sides of the end parts 20*a*, 20*b* of the coil 2 in the first direction D1 even if an error occurs in combining the coil 2 and the magnetic core 3. For example, the molded resin portion 5 to be described later can be provided on the outer periphery of the magnetic core 3. In molding the molded resin portion 5, the winding portion 20 is possibly compressed if a molding pressure is applied from the sides of the both end parts 20*a*, 20*b* of the winding portion 20. Even in this case, it can be suppressed that locations where only the first regions 41 are provided are formed on the outer sides of the end parts 20*a*, 20*b* of the winding portion 20 in the first direction D1 by locating the tip parts 4210 inside the winding portion 20.

If the tip parts 4210 are located inside the winding portion 20, the tip parts 4210 may be located near the respective end parts 20*a*, 20*b* of the winding portion 20. That is, the tip parts 4210 may be located slightly more inward of the winding portion 20 than the respective end parts 20*a*, 20*b* of the winding portion 20. For example, lengths of the tip parts 4210 located inside the winding portion 20 from the respective end parts 20*a*, 20*b* are $1/10$ or less, further $1/20$ or less, particularly $1/30$ or less of the entire length of the winding portion 20. In this case, the region of the middle core part 33 located inside the winding portion 20 is mostly constituted by the first regions 41.

Electromagnetically, the tip parts 4210 are preferably flush with the end surfaces of the respective end parts 20*a*, 20*b* of the winding portion 20. Further, the tip parts 4210 may not reach the respective end parts 20*a*, 20*b* of the winding portion 20. Further, the tip parts 4210 may be provided only in the respective end core parts 36, 37 and may not be provided in the middle core part 33. The longer the first projecting regions 421, the higher the relative magnetic permeability of the magnetic core 3. That is, the relative magnetic permeability of the magnetic core 3 can be adjusted by adjusting the lengths of the first projecting regions 421.

One first projecting region 421 is provided on one side of this example. A plurality of the first projecting regions 421 may be provided as long as being provided between the two first corner parts 381. Further, each first projecting region 421 of this example has a rectangular parallelepiped shape extending along the first direction D1. The shape of each first projecting region 421 does not particularly matter if the first projecting region 421 can attract the magnetic flux flowing from the middle core part 33 toward the end core part 36 and introduce the magnetic flux flowing from the end core part 37 to the middle core part 33 into the winding portion 20.

A length of the base end region 420 along the second direction D2 is longer than that of the first projecting region 421 along the second direction D2. The base end region 420 of this example extends toward both sides in the second direction D2 from the first projecting region 421. The base end region 420 may extend toward one side in the second direction D2 from the first projecting region 421.

The second regions 42 of this example are constituted by the respective second core pieces 32*a*, 32*b*.

A ratio of the first regions 41 in the magnetic core 3 is 50% by volume or more, further 55% by volume or more, particularly 60% by volume or more when the magnetic core 3 is 100% by volume. Further, the ratio of the first regions 41 in the middle core part 33 is 80% by volume or more, further 85% by volume or more, particularly 90% by volume or more when the middle core part 33 is 100% by volume. The middle core part 33 may include the second regions 42 with the first regions 41 interposed between the first projecting regions 421 and the second regions 42. Besides, the middle core part 33 may include the second regions 42 in outer peripheral regions except the first corner parts 381.

(Constituent Materials)

The first and second regions 41, 42 are constituted by compacts containing a soft magnetic material. Examples of the soft magnetic material include metals such as iron and iron alloys and nonmetals such as ferrite. For example, Fe—Si alloys, Fe—Ni alloys and the like can be, for example, cited as iron alloys. Compacts containing the soft magnetic material include compacts of composite materials, powder compacts and the like.

In the compact of the composite material, the soft magnetic powder is dispersed in a resin. The compact of the composite material is obtained by filling a raw material, in which a soft magnetic powder is mixed and dispersed in the uncured resin, into a mold and solidifying the resin. The composite material easily controls magnetic properties such as a relative magnetic permeability and a saturated magnetic flux density by adjusting a content of the soft magnetic powder in the resin. Particularly, in the composite material, the content of the soft magnetic powder is easily adjusted to decrease and the relative magnetic permeability is easily reduced. Further, the composite material is easily formed into even a complicated shape as compared to powder compacts. The content of the soft magnetic powder in the compact of the composite material is, for example, 20% by volume or more and 80% by volume or less if the composite material is 100% by volume. The content of the resin in the compact of the composite material is, for example, 20% by volume or more and 80% by volume or less if the composite material is 100% by volume.

The powder compact is obtained by compression-forming a powder made of a soft magnetic material, i.e. a soft magnetic powder. The powder compact has a higher rate of the soft magnetic powder to the core piece as compared to compacts of composite materials. Thus, the powder compact easily enhances magnetic properties, e.g. a relative magnetic permeability and a saturated magnetic flux density. A content of the soft magnetic powder in the powder compact is, for example, more than 80% by volume, further 85% by volume or more if the powder compact is 100% by volume.

The soft magnetic powder is an aggregate of soft magnetic particles. The soft magnetic particles may be coated particles including insulation coatings on the surfaces of the soft magnetic particles. Phosphates and the like can be cited as a constituent material of the insulation coatings. Thermosetting resins and thermoplastic resins can be, for example, cited as the resin of the composite material. An epoxy resin, a phenol resin, a silicone resin, a urethane resin and the like can be, for example, cited as the thermosetting resins. A polyphenylene sulfide (PPS) resin, a polyamide (PA) resin (e.g. nylon 6, nylon 66, nylon 9T or the like), a liquid crystal polymer (LCP), a polyimide (PI) resin, a fluororesin and the like can be cited as the thermoplastic resins. The composite material may contain a filler in addition to the resin. The heat dissipation of the composite material can be improved by containing the filler. Powders made of nonmagnetic materials such as ceramics and carbon nanotubes can be, for example, used as the filler. Oxides, nitrides, carbides and the like of metals or nonmetals can be, for example, cited as the ceramics. Examples of the oxides include alumina, silica and magnesium oxide. Examples of the nitrides include silica nitride, aluminum nitride and boron nitride. Examples of the carbides include silicon carbide.

In this example, the first regions 41, i.e. the respective first core pieces 31*a*, 31*b* (FIG. 2) are constituted by compacts of a composite material. By constituting the first regions 41 by the compacts of the composite material, the first regions 41 having a low relative magnetic permeability are easily obtained. On the other hand, the second regions 42, i.e. the respective second core pieces 32*a*, 32*b* (FIG. 2), are constituted by powder compacts. By constituting the second regions 42 by the powder compacts, the second regions 42 having a high relative magnetic permeability are easily obtained. If the first regions 41 are constituted by the compacts of the composite material and the second regions 42 are constituted by the powder compacts, the second regions 42 can be insert-molded in the first regions 41.

Both the first and second regions 41, 42 may be constituted by compacts of the composite material. Further, both the first and second regions 41, 42 may be constituted by powder compacts. In either case, the relative magnetic permeability of the second regions 42 may be set higher than that of the first regions 41 by making the contents of the soft magnetic powder different.

(Flow of Magnetic Flux)

With reference to FIG. 4, a flow of a magnetic flux in the magnetic core 3 is described. First, the magnetic flux flowing from the middle core part 33 to the end core part 36 is attracted to the first projecting region 421 provided in the end core part 36. Particularly, since the tip part 4210 of the first projecting region 421 reaches the end part 20*a* (FIG. 3) of the winding portion 20 in this example, the magnetic flux is attracted to the first projecting region 421 inside the winding portion 20. The magnetic flux attracted to the first projecting region 421 flows in the base end region 420 after flowing in the first projecting region 421. Thus, most of the magnetic flux flows in the middle core part 33 and a central part of the end core part 36 to avoid the first corner parts 381.

The magnetic flux flowing in the end core part 36 mainly flows in the base end region 420. The base end region 420 is provided away from the surface of the end core part 36 facing the end surface of the winding portion 20. Thus, the magnetic flux flows toward the respective side core parts 34, 35 from the outer sides of the end core part 36. Therefore, most of the magnetic flux flows to avoid the second corner parts 382 on the inner sides constituted by the end core part 36 and the respective side core parts 34, 35.

The magnetic flux flowing from the respective side core parts 34, 35 to the end core part 37 is attracted to the base end region 420 provided in the end core part 37. The magnetic flux attracted to the base end region 420 is introduced into the winding portion 20 by flowing in the first projecting region 421. Thus, most of the magnetic flux flows in the end core part 37 and a central part of the middle core part 33 to avoid the first corner parts 381.

(Molded Resin Portion)

As shown in FIG. 1, the reactor 1 can include the molded resin portion 5. The molded resin portion 5 at least partially covers the magnetic core 3. This molded resin portion 5 has a function of protecting the magnetic core 3 from an external environment. The molded resin portion 5 may further cover the coil 2. That is, the molded resin portion 5 is provided to at least partially cover an assembly of the coil 2 and the magnetic core 3. If the molded resin portion 5 is interposed between the coil 2 and the magnetic core 3, insulation between the coil 2 and the magnetic core 3 is easily ensured. If the molded resin portion 5 is present over and between a plurality of core pieces, the core pieces are easily positioned with respect to each other. If the molded resin portion 5 is present over and between the coil 2 and the magnetic core 3, the coil 2 and the magnetic core 3 are easily positioned with respect to each other.

The molded resin portion 5 of this example covers the outer periphery of the assembly of the coil 2 and the magnetic core 3. Thus, the assembly of this example is protected from an external environment by the molded resin portion 5. Further, the assembly of this example is configured by integrating the coil 2 and the magnetic core 3 by the molded resin portion 5. The outer peripheral surface of the magnetic core 3 or the outer peripheral surface of the coil 2 may be at least partially exposed from the molded resin portion 5.

The molded resin portion 5 of this example is interposed between the inner surface of the winding portion 20 and the middle core part 33. Further, the molded resin portion 5 of this example is filled into the gap 39 (FIG. 3) provided in the middle core part 33 to constitute the gap material.

The resin constituting the molded resin portion 5 is, for example, a resin similar to the resin of the composite material described above. A constituent material of the molded resin portion 5 may contain the aforementioned filler similarly to the composite material.

<<Miscellaneous>>

Although not shown, the reactor 1 may include at least one of a case, an adhesive layer and a holding member. The case accommodates the assembly of the coil 2 and the magnetic core 3. In the case of including the case, a sealing resin portion may be filled between the assembly and the case. The adhesive layer fixes the assembly to an installation surface. The holding member is interposed between the coil 2 and the magnetic core 3 and has a function of ensuring electrical insulation between the coil 2 and the magnetic core 3. Further, the holding member has a function of specifying the mutual positions of the coil 2 and the magnetic core 3 and holding a positioned state.

<<Effects>>

The reactor 1 of the first embodiment can control the flow of the magnetic flux from the middle core part 33 to the end core part 36 as shown in FIG. 4. Further, the reactor 1 of the first embodiment can control the flow of the magnetic flux from the end core part 37 to the middle core part 33 as shown in FIG. 4. Thus, the reactor 1 of the first embodiment can reduce a leakage magnetic flux from the first corner parts 381. Besides, the reactor 1 of the first embodiment can reduce the relative magnetic permeability of each end core part 36, 37 and suppress the magnetic saturation of the magnetic core 3 by having the first regions 41 in the first corner parts 381. Further, in the reactor 1 of the first embodiment, the first middle core part 33 and the end core part 36 in the core piece 3*a* and the second middle core part 332 and the end core part 37 in the core piece 3*b* can be constituted by integrated objects by having the first regions 41 in the first corner parts 381. By constituting these by the integrated objects, the number of components of the magnetic core 3 can be reduced and productivity can be improved.

In the reactor 1 of the first embodiment, most of the magnetic core 3 is constituted by the first regions 41 having a low relative magnetic permeability. Thus, the gap provided in the magnetic core 3 can be reduced since the relative magnetic permeability of the magnetic core 3 can be reduced. In the reactor 1 of the first embodiment, the gap 39 is provided only in the middle core part 33. Since the middle core part 33 is arranged inside the winding portion 20, a leakage magnetic flux from the gap 39 is easily reduced.

Second Embodiment

Figure 5:
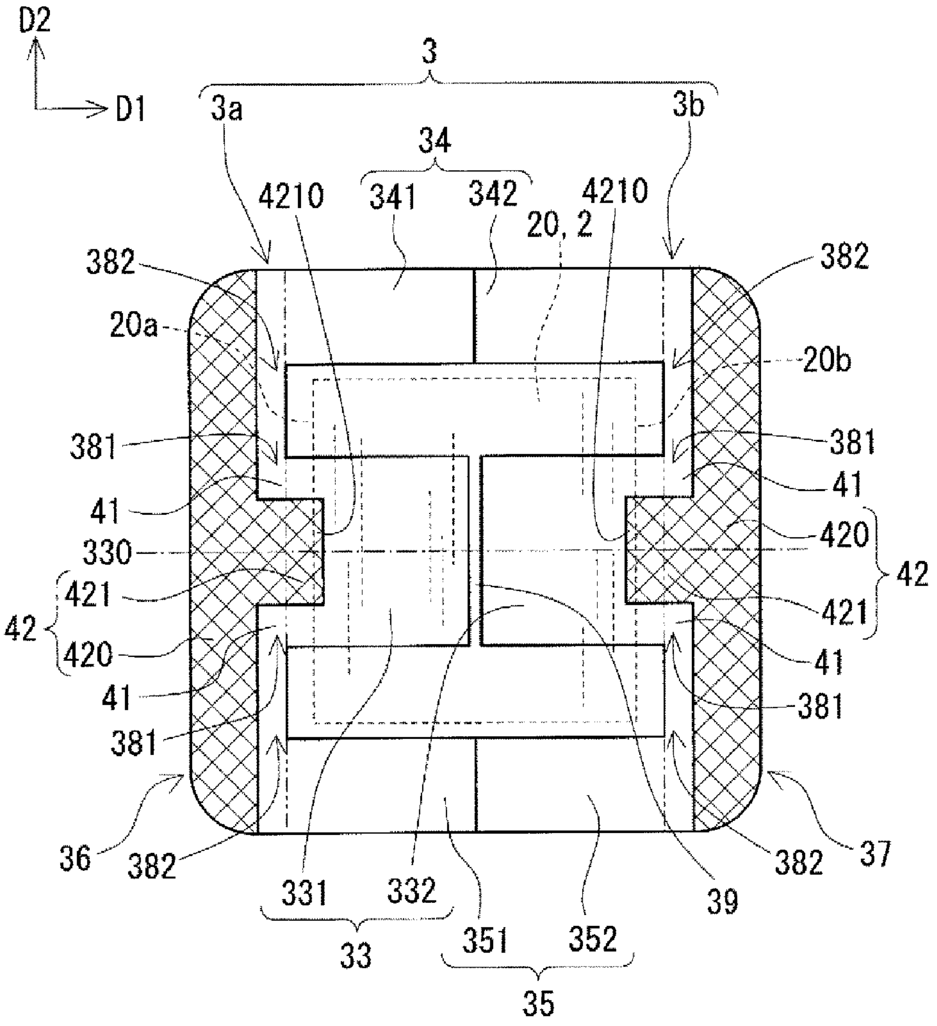
FIG. 5 is a plan view showing an outline of a reactor of a second embodiment.

A reactor of a second embodiment is described with reference to FIG. 5. In FIG. 5, a coil 2 is shown by a broken line for the convenience of description. The reactor of the second embodiment differs from the reactor 1 of the first embodiment in the arrangement of first and second regions 41, 42. Specifically, ranges of the second regions 42 are larger in the second embodiment than in the first embodiment. The following description is centered on points of difference from the first embodiment described above and similar matters are not described.

In the second region 42 of this example, a range of a base end region 420 is larger than in the second region 42 of the first embodiment. The base end region 420 of this example is provided up to both end parts along the second direction D2 in each end core part 36, 37. That is, the base end region 420 of this example constitutes an entire outer surface along the second direction D2 in each end core part 36, 37.

If the ranges of the second regions 42 are enlarged, a relative magnetic permeability of a magnetic core 3 increases. Thus, a width of a gap 39 provided in the magnetic core 3 is larger in the second embodiment than in the first embodiment.

In this example, a magnetic flux flows on outer sides of the end core part 36 since the base end region 420 extends up to the both end parts of the end core part 36. The magnetic flux flowing on the outer sides of the end core part 36 is easily gathered on the outer sides in transition points from the end core part 36 to the respective side core parts 34, 35. Thus, the magnetic flux flowing from the end core part 36 toward the respective side core parts 34, 35 flows to avoid second corner parts 382 on inner sides constituted by the end core part 36 and the respective side core parts 34, 35. Similarly, the magnetic flux flowing from the respective side core parts 34, 35 toward the end core part 37 also flows to avoid second corner parts 382 on inner sides constituted by the end core part 37 and the respective side core part 34, 35. Thus, a leakage magnetic flux from the second corner parts 382 can be suppressed.

An assembly of the coil 2 and the magnetic core 3 may be accommodated in an unillustrated case as described above. The case is typically fixed to an installation target by bolts. Specifically, the case is provided with projecting pieces projecting outward. The projecting pieces are provided with bolt holes. The bolt holes of the projecting pieces and those of the installation target are aligned and bolts are screwed into the both bolt holes, whereby the case is fixed to the installation target. The reactor of this example easily reduce a leakage magnetic flux flowing from the end core parts 36, 37 toward the bolts and the projecting pieces since the ranges of the second regions 42 are wide.

Third Embodiment

Figure 6:
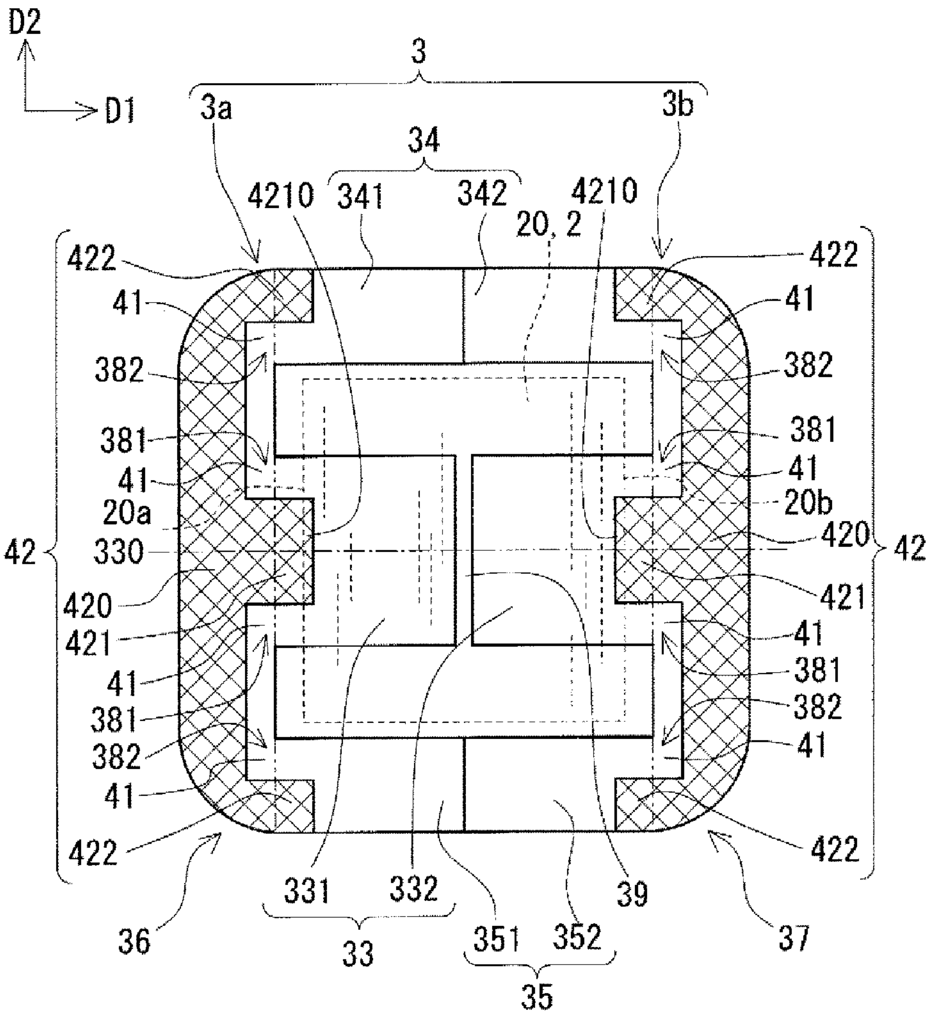
FIG. 6 is a plan view showing an outline of a reactor of a third embodiment.

A reactor of a third embodiment is described with reference to FIG. 6. In FIG. 6, a coil 2 is shown by a broken line for the convenience of description. Ranges of second regions 42 are even larger in the third embodiment than in the second embodiment. The following description is centered on points of difference from the second embodiment described above, and similar matters are not described.

The second region 42 of this example further includes second projecting regions 422. The second projecting regions 422 project from a base end region 420 toward respective side core parts 34, 35. The second projecting regions 422 of this example respectively project from both end parts of the base end region 420. The second projecting regions 422 are provided to avoid second corner parts 382 constituted by respective end core parts 36, 37 and the respective side core parts 34, 35. Each second corner part 382 is constituted by a first region 41.

In this example, projecting lengths of the second projecting regions 422 are equal to that of a first projecting region 421. The projecting lengths of the second projecting regions 422 may be shorter or longer than that of the first projecting region 421.

As described above, if the ranges of the second regions 42 are enlarged, a relative magnetic permeability of a magnetic core 3 increases. Thus, a width of a gap 39 provided in the magnetic core 3 is larger in the third embodiment than in the second embodiment. The width of the gap 39 can be appropriately selected according to the projecting lengths of the second projecting regions 422.

The second regions 42 of this example are not provided in regions of the respective side core parts 34, 35 facing the winding portion 20. That is, the first regions 41 are provided in the regions of the respective side core parts 34, 35 facing the winding portion 20. Thus, in this example, all regions of a middle core part 33, the respective side core parts 34, 35 and the respective end core parts 36, 37 facing the winding portion 20 are constituted by the first regions 41.

In this example, a magnetic flux flows on outer sides of the end core part 36 since the base end region 420 extends up to the both end parts of the end core part 36. Further, in this example, the magnetic flux flowing on the outer sides of the end core part 36 is easily gathered on the outer sides in transition points from the end core part 36 to the respective side core parts 34, 35 by including the second projecting regions 422 in the respective side core parts 34, 35. Thus, the magnetic flux flowing from the end core part 36 toward the respective side core parts 34, 35 flows to avoid second corner parts 382 on inner sides constituted by the end core part 36 and the respective side core part 34, 35. Similarly, the magnetic flux flowing from the respective side core parts 34, 35 toward the end core part 37 also flows to avoid second corner parts 382 on inner sides constituted by the end core part 37 and the respective side core part 34, 35. Thus, a leakage magnetic flux from the second corner parts 382 can be more suppressed.

Fourth Embodiment

Figure 7:
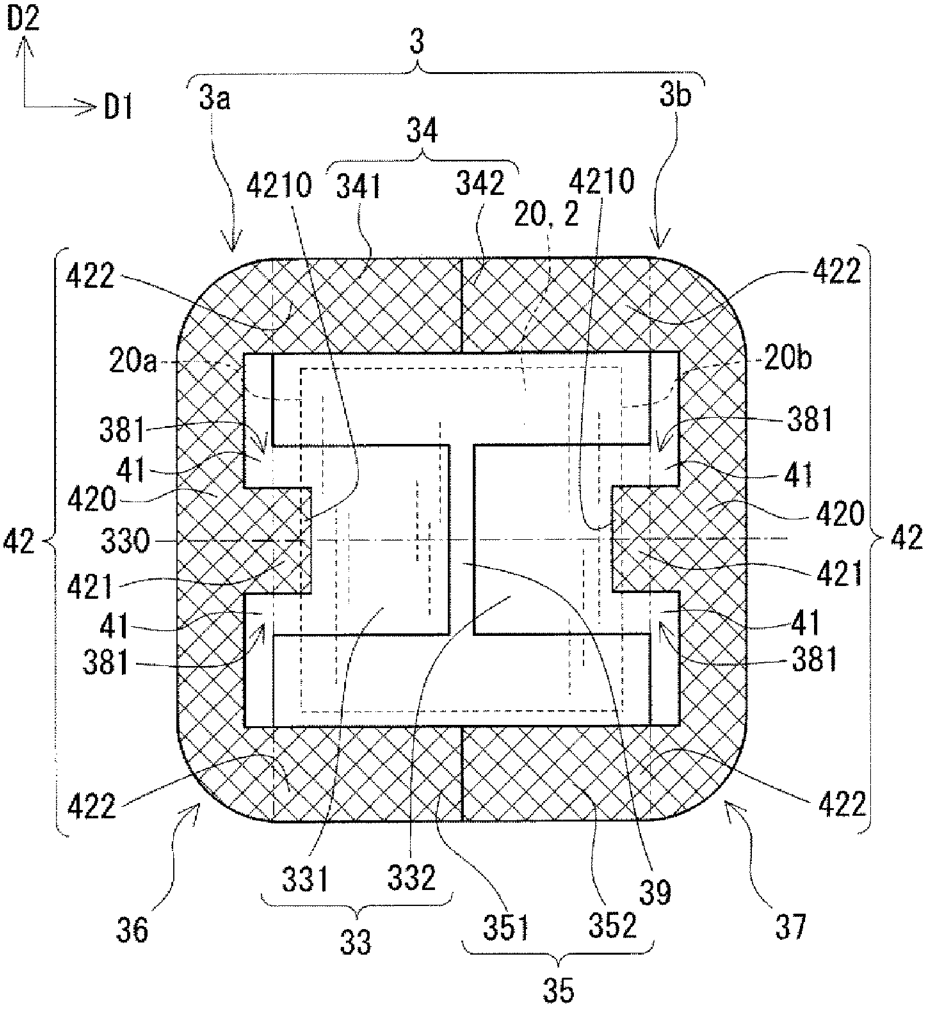
FIG. 7 is a plan view showing an outline of a reactor of a fourth embodiment.

A reactor of a fourth embodiment is described with reference to FIG. 7. In FIG. 7, a coil 2 is shown by a broken line for the convenience of description. Ranges of second regions 42 are even larger in the fourth embodiment than in the third embodiment. The following description is centered on points of difference from the third embodiment described above, and similar matters are not described.

Second projecting regions 422 in the second regions 42 of this example are provided in the entire regions of respective side core parts 34, 35. That is, the second projecting regions 422 are also provided in regions of the respective side core parts 34, 35 facing a winding portion 20.

Since most of a magnetic core 3 to be arranged outside the winding portion 20 is constituted by the second regions 42 in the reactor of this example, a flow of a magnetic flux flowing on outer sides of the winding portion 20 is easily controlled. However, as described above, a relative magnetic permeability of the magnetic core 3 increases if the ranges of the second regions 42 are enlarged. Thus, a width of a gap 39 is larger in this example than in the third embodiment.

Fifth Embodiment

Figure 8:
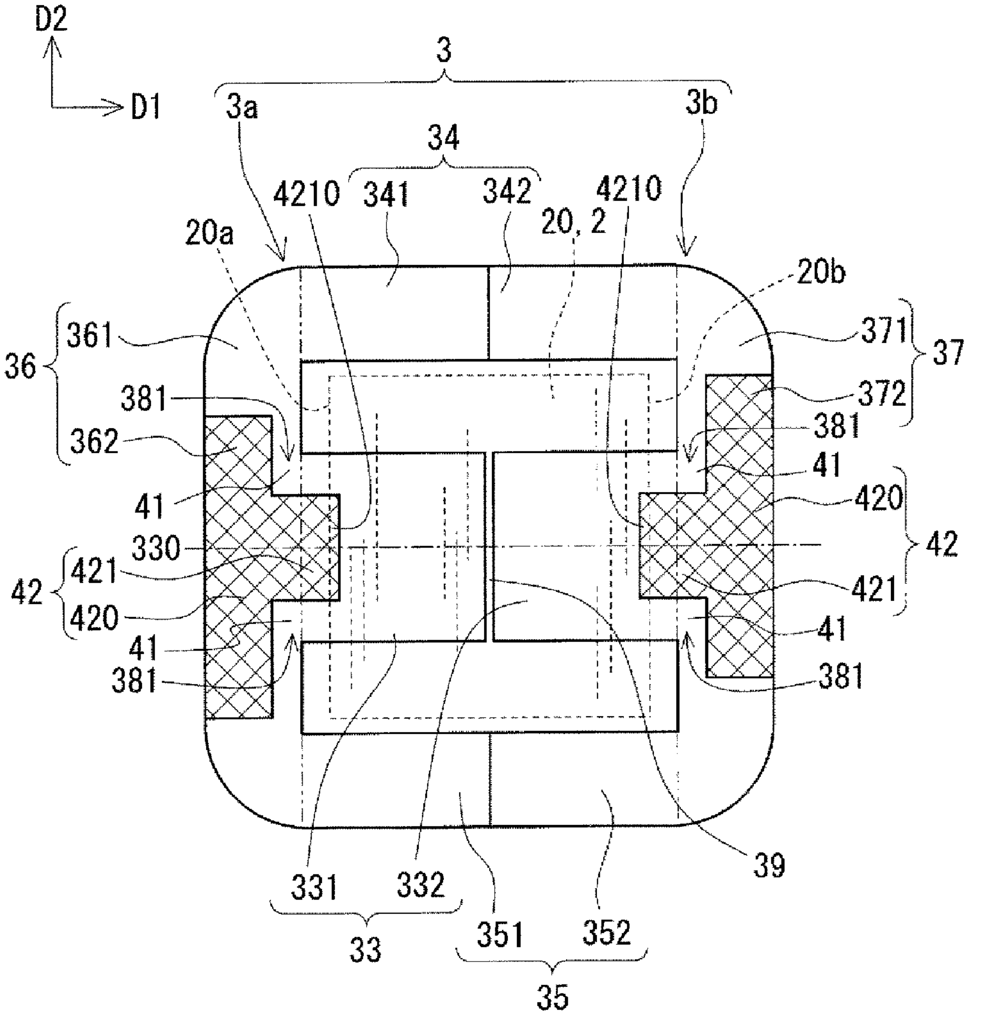
FIG. 8 is a plan view showing an outline of a reactor of a fifth embodiment.

A reactor of a fifth embodiment is described with reference to FIG. 8. In FIG. 8, a coil 2 is shown by a broken line for the convenience of description. The reactor of the fifth embodiment differs from the first embodiment in that a second region 42 provided on the side of an end core part 36 and a second region 42 provided on the side of an end core part 37 are asymmetrical. Asymmetry here means asymmetry with respect to a median line bisecting a middle core part 33 in the first direction D1. The following description is centered on points of difference from the first embodiment described above, and similar matters are not described.

In the second region 42 provided on the side of the end core part 36 of this example, a length of a region extending from a first projecting region 421 toward a side core part 34 along the second direction D2 is shorter than that of a region extending from the first projecting region 421 toward a side core part 35 along the second direction D2. That is, the second region 42 provided on the side of the end core part 36 is shaped asymmetrically with respect to an axis 330 of the middle core part 33. On the other hand, in the second region 42 provided on the side of the end core part 37 of this example, a length of a region extending from a first projecting region 421 toward the side core part 34 along the second direction D2 is longer than that of a region extending from the first projecting region 421 toward the side core part 35 along the second direction D2. That is, the second region 42 provided on the side of the end core part 37 is also shaped asymmetrically with respect to the axis 330 of the middle core part 33, similarly to the second region 42 provided on the side of the end core part 36. The second region 42 provided on the side of the end core part 36 and the second region 42 provided on the side of the end core part 37 are shaped asymmetrically with respect to the median line.

Note that even if the second region 42 provided on the side of the end core part 36 and the second region 42 provided on the side of the end core part 37 have the same shape, the respective second regions 42 may be arranged asymmetrically with respect to the median line. Asymmetry here means, for example, that the respective second regions 42 are arranged at positions shifted in the second direction D2.

Besides, the second region 42 provided on the side of the end core part 36 and the second region 42 provided on the side of the end core part 37 may have the same shape and the shape of each second region 42 may be asymmetrical about the first projecting region 421.

Sixth Embodiment

Figure 9:
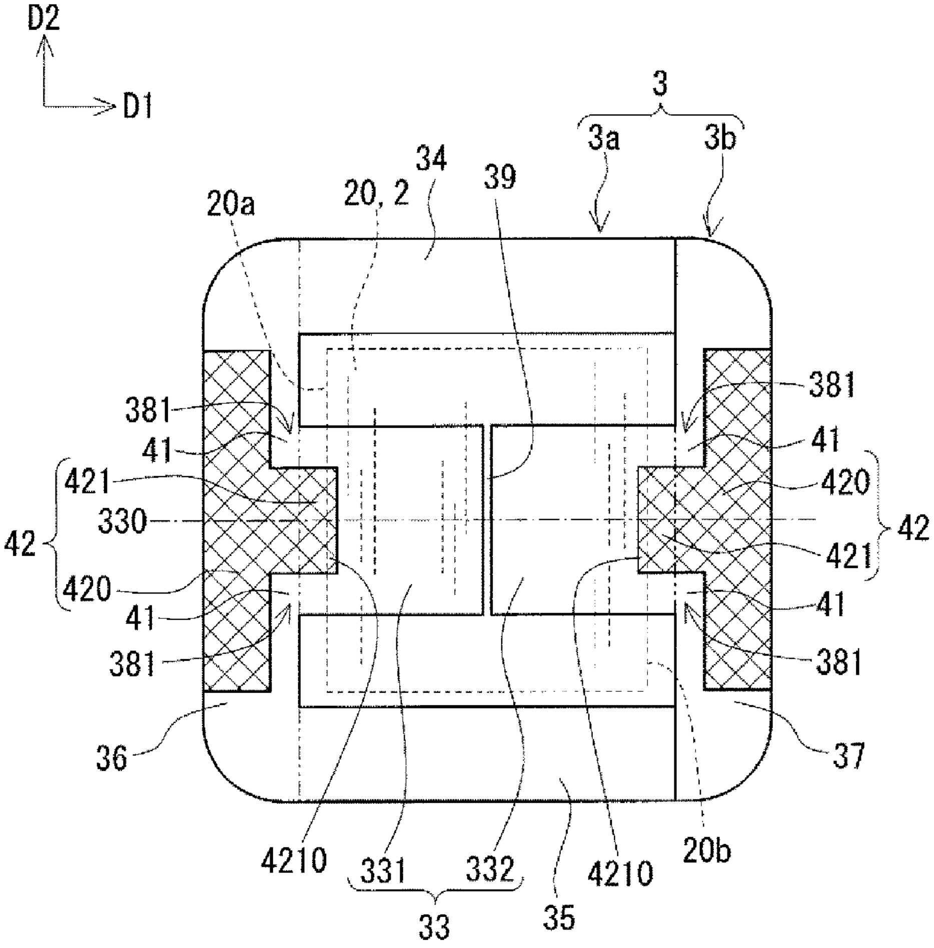
FIG. 9 is a plan view showing an outline of a reactor of a sixth embodiment.

A reactor of a sixth embodiment is described with reference to FIG. 9. In FIG. 9, a coil 2 is shown by a broken line for the convenience of description. The reactor of the sixth embodiment differs from the reactor 1 of the first embodiment in the shapes of two core pieces 3*a*, 3*b* constituting a magnetic core 3. The following description is centered on points of difference from the first embodiment described above, and similar matters are not described.

The core piece 3*a* of this example includes an end core part 36, a first middle core part 331 and two side core parts 34, 35. The first middle core part 331 is a part of a middle core part 33. A length of the first middle core part 331 along the first direction D1 is shorter than those of the two side core parts 34, 35 along the first direction D1. Thus, the core piece 3*a* of this example is an E-shaped member in which the length of the first middle core part 331 is shorter than those of the two side core parts 34, 35. The core piece 3*b* of this example includes an end core part 37 and a second middle core part 332. The second middle core part 332 is a remaining part of the middle core part 33 except the first middle core part 331 and a gap 39. The core piece 3*b* of this example is a T-shaped member. The magnetic core 3 is configured into a θ shape by combining the E-shaped core piece 3*a* and the T-shaped core piece 3*b*. In this example, the gap 39 is provided between the first and second middle core parts 331, 332.

The respective core pieces 3*a*, 3*b* can be appropriately provided to arrange first and second regions 41, 42 at predetermined locations. In this example, the shape of the second region 42 provided in the core piece 3*a* and that of the second region 42 provided in the core piece 3*b* are the same.

Seventh Embodiment

Figure 10:
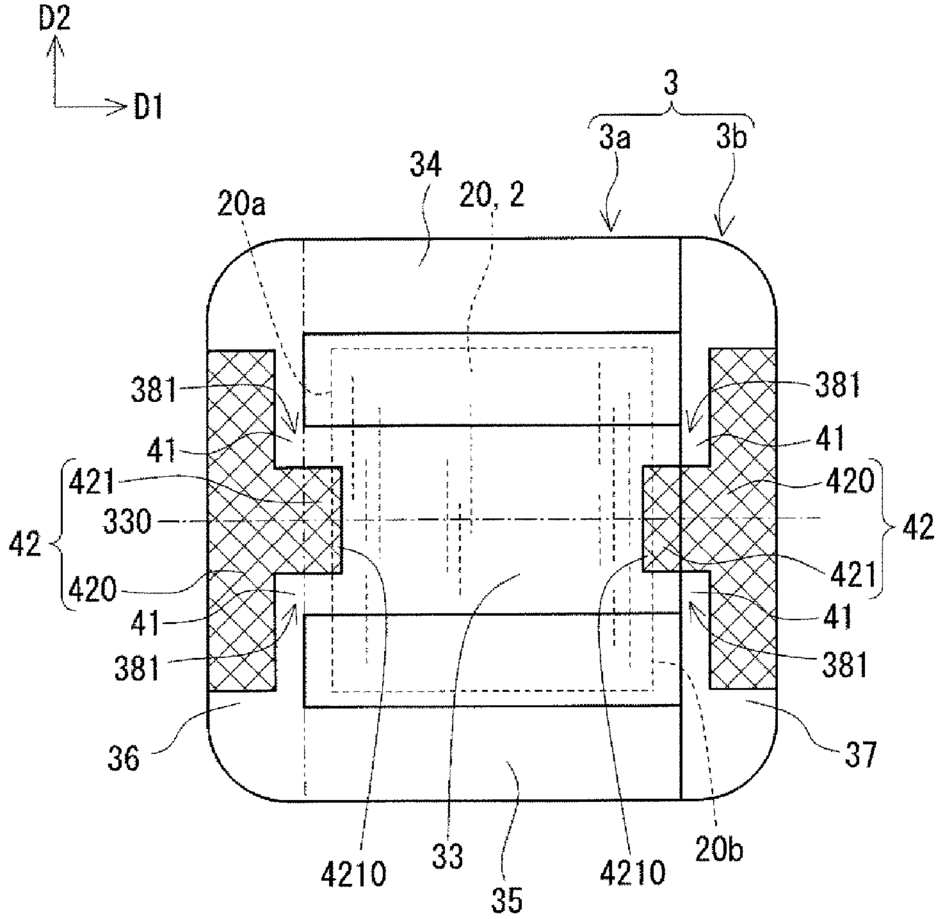
FIG. 10 is a plan view showing an outline of a reactor of a seventh embodiment.

A reactor of a seventh embodiment is described with reference to FIG. 10. In FIG. 10, a coil 2 is shown by a broken line for the convenience of description. The reactor of the seventh embodiment differs from the reactor 1 of the first embodiment in the shapes of two core pieces 3*a*, 3*b* constituting a magnetic core 3. The following description is centered on points of difference from the first embodiment described above, and similar matters are not described.

The core piece 3*a* of this example includes an end core part 36, a middle core part 33 and two side core parts 34, 35. The core piece 3*a* of this example is an E-shaped member. The core piece 3*b* of this example includes an end core part 37. The core piece 3*b* of this example is an I-shaped member. The magnetic core 3 is configured into a θ shape by combining the E-shaped core piece 3*a* and the I-shaped core piece 3*b*. In this example, no gap is provided. A gap can be provided at a halfway position of the middle core part 3 if necessary. Besides, a gap can be provided between the middle core part 33 and the end core part 37.

The respective core pieces 3*a*, 3*b* can be appropriately provided to arrange first and second regions 41, 42 at predetermined locations. In the core piece 3*a* of this example, the second region 42 is provided over the end core part 36 and the middle core part 33 and also provided on an end part of the middle core part 33 on the side of the end core part 37. The second region 42 provided on the end part of the middle core part 33 on the side of the end core part 37 is a part of a first projecting region 421. On the other hand, in the core piece 3*b* of this example, the second region 42 is provided in the end core part 37. By combining the core pieces 3*a*, 3*b*, the second region 42 straddling over the end core part 37 and the middle core part 33 is formed.

Eighth Embodiment

Figure 11:
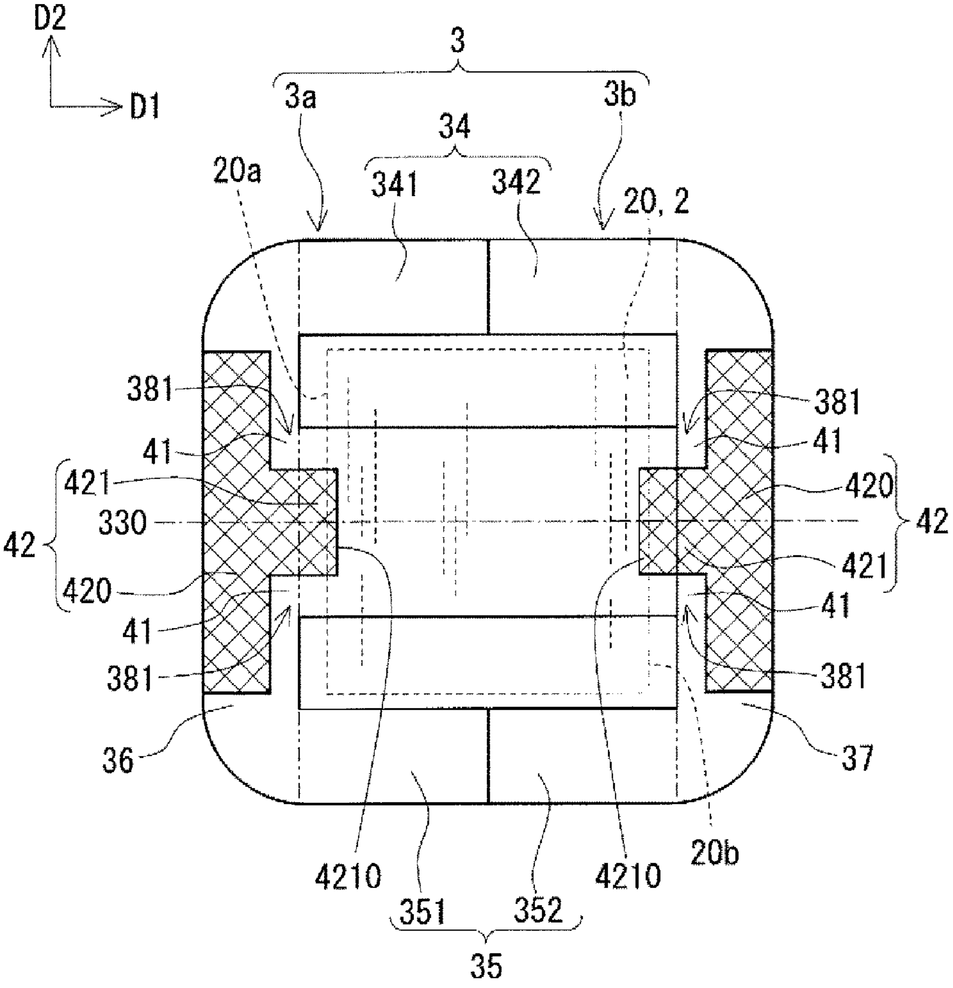
FIG. 11 is a plan view showing an outline of a reactor of an eighth embodiment.

A reactor of an eighth embodiment is described with reference to FIG. 11. In FIG. 11, a coil 2 is shown by a broken line for the convenience of description. The reactor of the eighth embodiment differs from the reactor 1 of the first embodiment in the shapes of two core pieces 3*a*, 3*b* constituting a magnetic core 3. The following description is centered on points of difference from the first embodiment described above, and similar matters are not described.

The core piece 3*a* of this example includes an end core part 36, a middle core part 33 and two first side core parts 341, 351. The first side core part 341 is a part of a side core part 34. The first side core part 351 is a part of a side core part 35. A length of the middle core part 33 along the first direction D1 is longer than those of the two first side core parts 341, 351 along the first direction D1. Thus, the core piece 3*a* of this example is an E-shaped member in which the length of the middle core part 33 is longer than those of the two first side core parts 341, 351. The core piece 3*b* of this example includes an end core part 37 and two second side core parts 342, 352. The second side core part 342 is a remaining part of the side core part 34. The second side core part 352 is a remaining part of the side core part 35. The core piece 3*b* of this example is a U-shaped member. The magnetic core 3 is formed into a θ shape as a whole by combining the E-shaped core piece 3*a* and the U-shaped core piece 3*b*. In this example, no gap is provided. A gap can be provided at a halfway position of the middle core part 3 if necessary. Besides, a gap can be provided between the middle core part 33 and the end core part 37.

The respective core pieces 3*a*, 3*b* can be appropriately provided to arrange first and second regions 41, 42 at predetermined locations. In the core piece 3*a* of this example, the second region 42 is provided over the end core part 36 and the middle core part 33 and also provided on an end part of the middle core part 33 on the side of the end core part 37. The second region 42 provided on the end part of the middle core part 33 on the side of the end core part 37 is a part of a first projecting region 421. On the other hand, in the core piece 3*b* of this example, the second region 42 is provided in the end core part 37. By combining the core pieces 3*a*, 3*b*, the second region 42 straddling over the end core part 37 and the middle core part 33 is formed.

Ninth Embodiment

The respective reactors 1 according to the first to eighth embodiments can be used in an application satisfying the following energizing conditions. The energizing conditions include, for example, a maximum direct current of about 100 A or more and 1000 A or less, an average voltage of about 100 V or more and 1000 V or less and a use frequency of about 5 kHz or more and 100 kHz or less. Each of the reactors 1 according to the first to eighth embodiments can be typically used as a constituent component of a converter to be installed in a vehicle such as an electric or hybrid vehicle and a constituent component of a power conversion device provided with this converter.

Figure 12:
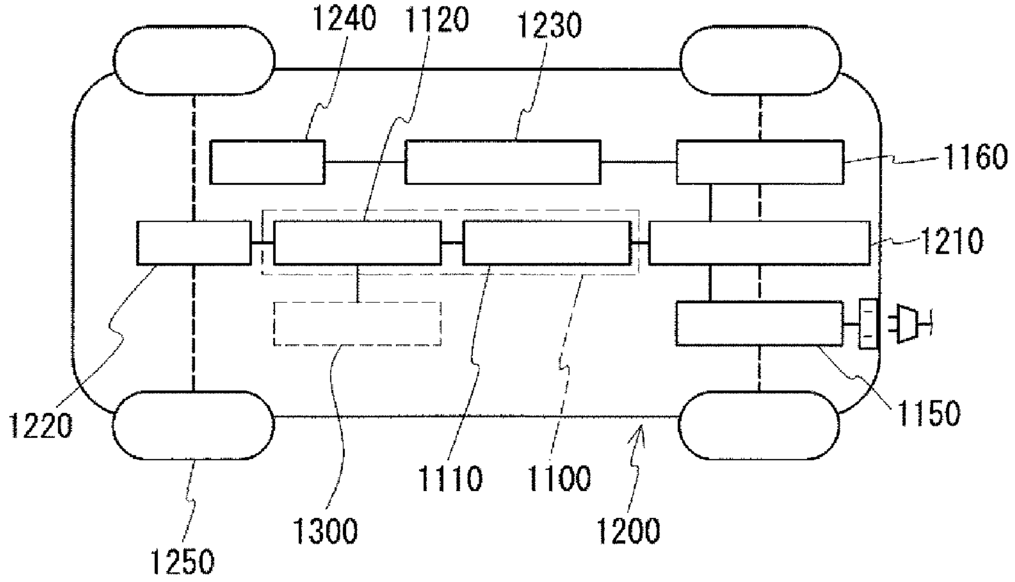
FIG. 12 is a configuration diagram schematically showing a power supply system of a hybrid vehicle.

A vehicle 1200 such as a hybrid or electric vehicle is, as shown in FIG. 12, provided with a main battery 1210, a power conversion device 1100 to be connected to the main body 1210 and a motor 1220 used for travel by being driven by power supplied from the main body 1210. The motor 1220 is, typically, a three-phase alternating current motor and has a function of driving wheels 1250 during travel and a function as a generator during regeneration. In the case of a hybrid vehicle, the vehicle 1200 includes an engine 1300 in addition to the motor 1220. FIG. 12 shows an inlet as a charging point of the vehicle 1200, but the vehicle 1200 can include a plug.

The power conversion device 1100 includes a converter 1110 to be connected to the main battery 1210 and an inverter 1120 connected to the converter 1110 for the mutual conversion of a direct current and an alternating current. The converter 1110 shown in this example steps up an input voltage of the main battery 1210 of about 200 V or more and 300 V or less to about 400 V or more and 700 V or less and supplies the stepped-up voltage to the inverter 1120 during the travel of the vehicle 1200. The converter 1110 steps down an input voltage output from the motor 1220 via the inverter 1120 to a direct-current voltage suitable for the main battery 1210 and charges the direct-current voltage to the main battery 1210 during regeneration. The input voltage is a direct-current voltage. The inverter 1120 converts the direct current stepped up by the converter 1110 into a predetermined alternating current and supplies the converted current to the motor 1220 during the travel of the vehicle 1200 and converts an alternating current from the motor 1220 into a direct current and outputs the direct current to the converter 1110 during regeneration.

Figure 13:
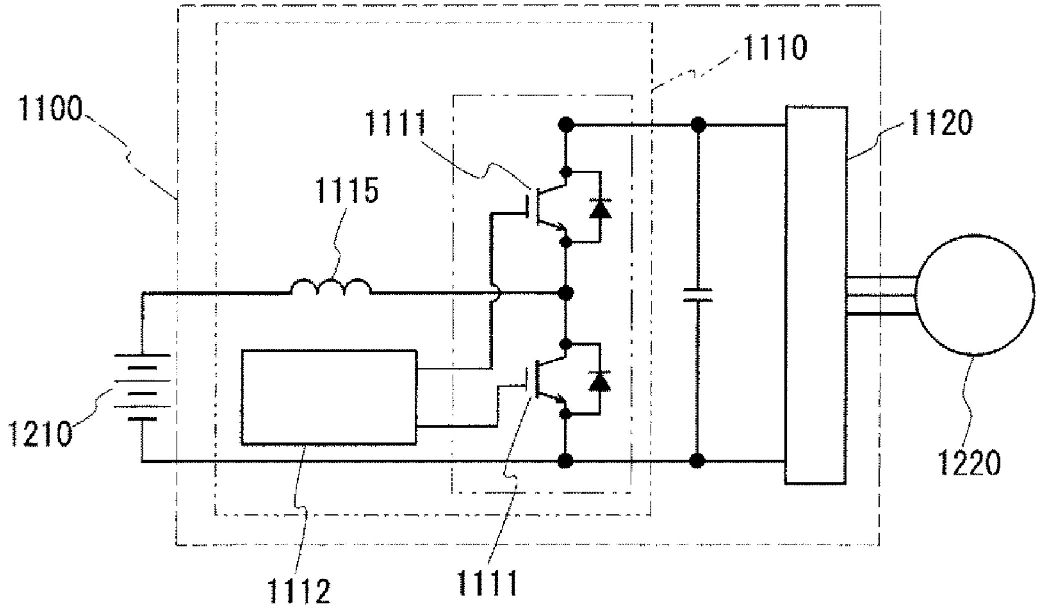
FIG. 13 is a circuit diagram showing an outline of an example of a power conversion device provided with a converter.

The converter 1110 includes a plurality of switching elements 1111, a drive circuit 1112 for controlling the operation of the switching elements 1111 and a reactor 1115 as shown in FIG. 13, and converts an input voltage by being repeatedly turned on and off. The conversion of the input voltage means voltage step-up and -down here. A power device such as a field effect transistor or an insulated gate bipolar transistor is used as the switching element 1111. The reactor 1115 has a function of smoothing a change of a current when the current is increased or decreased by a switching operation, using a property of a coil to hinder a change of a current flowing into a circuit. The reactor of any one of the first to eighth embodiments is provided as the reactor 1115. By including the reactor capable of reducing a leakage magnetic flux, the power conversion device 1100 and the converter 1110 can be expected to have low loss.

Besides the converter 1110, the vehicle 1200 is provided with a power supply device converter 1150 connected to the main battery 1210 and an auxiliary power supply converter 1160 connected to a sub-battery 1230 serving as a power source of auxiliary devices 1240 and the main battery 1210 and configured to convert a high voltage of the main battery 1210 into a low voltage. The converter 1110 typically performs DC-DC conversion, but the power supply device converter 1150 and the auxiliary power supply converter 1160 perform AC-DC conversion. The power supply device converter 1150 may perform DC-DC conversion. Reactors configured similarly to the reactor of any one of the first to eighth embodiments and appropriately changed in size, shape and the like can be used as reactors of the power supply device converter 1150 and the auxiliary power supply converter 1160. Further, the reactor of any one of the first to eighth embodiments can also be used in a converter for converting input power and only stepping up or only stepping down a voltage.

LIST OF REFERENCE NUMERALS

1 reactor
2 coil, 20 winding portion, 20*a*, 20*b* end part
3 magnetic core, 3*a*, 3*b* core piece
31*a*, 31*b* first core piece
310 recess, 311 first recess, 312 second recess
32*a*, 32*b* second core piece
33 middle core part, 330 axis
331 first middle core part, 332 second middle core part
34, 35 side core part
341, 351 first side core part, 342, 352 second side core part
36, 37 end core part
361, 371 first end core part, 362, 372 second end core part
381 first corner part, 382 second corner part
39 gap
41 first region
42 second region
420 base end region
421 first projecting region, 4210 tip part
422 second projecting region
5 molded resin portion
D1 first direction, D2 second direction, D3 third direction
1100 power conversion device, 1110 converter, 1111 switching element
1112 drive circuit, 1115 reactor, 1120 inverter
1150 power supply device converter, 1160 auxiliary power supply converter
1200 vehicle, 1210 main battery, 1220 motor
1230 sub-battery, 1240 auxiliary devices, 1250 wheel, 1300 engine

What is claimed is:

1. A reactor, comprising:
a coil: and
a magnetic core,
the coil including one winding portion,
the magnetic core including a middle core part, two side core parts and two end core parts,
the middle core part having a part to be arranged inside the winding portion,
each of the two side core parts being arranged side by side with the middle core part outside the winding portion,
each of the two end core parts being arranged to connect the middle core part and the two side core parts outside end parts of the winding portions,
the magnetic core having a first region and a second region having a higher relative magnetic permeability than the first region,
the first region including two corner parts constituted by the middle core part and each of the two end core parts,
the second region including a base end region and a projecting region,
the base end region extending in a parallel direction of the middle core part and the two side core parts across an axis of the middle core part in each of the two end core parts, and
the projecting region projecting toward the middle core part from the base end region.

2. The reactor of claim 1, wherein the projecting region has a tip part reaching the end part of the winding portion on a proximate side.

3. The reactor of claim 1, wherein a central region in an axial direction of the middle core part is constituted by the first region.

4. The reactor of claim 1, wherein a region of each of the two end core parts facing the winding portion is constituted by the first region.

5. The reactor of claim 1, wherein each of the two side core parts is constituted by the first region.

6. The reactor of claim 1, wherein the relative magnetic permeability in the first region is 5 or more and 50 or less.

7. The reactor of claim 1, wherein the relative magnetic permeability in the second region is 50 or more and 500 or less.

8. The reactor of claim 1, wherein the first region is constituted by a compact of a composite material, a soft magnetic powder being dispersed in a resin in the composite material.

9. The reactor of claim 1, wherein the second region is constituted by a powder compact made of a soft magnetic powder.

10. The reactor of claim 1, wherein:

the magnetic core is composed of two core pieces having the same shape, and each of the two core pieces is an E-shaped member including one of the two end core parts, a part of the middle core part and a part of each of the two side core parts.

11. The reactor of claim 1, comprising a molded resin portion for at least partially covering the magnetic core.

12. A converter, comprising the reactor of claim 1.

13. A power conversion device, comprising the converter of claim 12.

* * * * *